US011577453B2

(12) United States Patent
Korten et al.

(10) Patent No.: US 11,577,453 B2
(45) Date of Patent: Feb. 14, 2023

(54) ADDITIVE MANUFACTURING SYSTEM AND A METHOD OF ADDITIVE MANUFACTURING

(71) Applicant: 3M INNOVATIVE PROPERTIES COMPANY, St. Paul, MN (US)

(72) Inventors: Malte Korten, Moorenweis (DE);
Helmar Mayr, Kaufering (DE);
Gioacchino Raia, Türkenfeld (DE);
Bernhard Hofmann, Peißenberg (DE);
Adrian Eckert, Herrsching (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 107 days.

(21) Appl. No.: 17/248,456

(22) Filed: Jan. 26, 2021

(65) Prior Publication Data

US 2021/0146612 A1    May 20, 2021

Related U.S. Application Data

(63) Continuation of application No. 16/060,046, filed as application No. PCT/US2016/066108 on Dec. 12, 2016, now Pat. No. 10,953,596.

(51) Int. Cl.
*B29C 67/00* (2017.01)
*B29C 64/135* (2017.01)
(Continued)

(52) U.S. Cl.
CPC .......... *B29C 64/135* (2017.08); *B29C 64/124* (2017.08); *B29C 64/336* (2017.08);
(Continued)

(58) Field of Classification Search
CPC ... B29C 64/124; B29C 64/336; B29C 64/393; B33Y 10/00; B33Y 30/00; B33Y 50/00; B33Y 50/02
See application file for complete search history.

(56) References Cited

U.S. PATENT DOCUMENTS 10,182,892 B2    1/2019    Korten
10,953,596 B2    3/2021    Korten
(Continued)

FOREIGN PATENT DOCUMENTS

DE    102007010624    4/2009
EP    2799032    11/2014
(Continued)

OTHER PUBLICATIONS

International Search Report for PCT International Application No. PCT/US2016/066108, dated Apr. 4, 2017, 5 pages.

*Primary Examiner* — Ryan M Ochylski

(57) ABSTRACT

An additive manufacturing system has a light permeable base, a build carrier for holding a workpiece and a light source which is arranged to emit light through the light permeable base. The light permeable base and the build carrier are positionable relative to each other in a build dimension in which the workpiece is built up. The system further has a resin vat in which the light permeable base forms a wall portion thereof. The system further comprises a plurality of resin supplies for supplying different light hardenable resins in direct contact with each other in said vat. The system facilitates the rapid manufacturing of a dental restoration having a color gradation.

5 Claims, 6 Drawing Sheets

(51) Int. Cl.
  *B33Y 10/00*   (2015.01)
  *B33Y 30/00*   (2015.01)
  *B29C 64/336*  (2017.01)
  *B29C 64/124*  (2017.01)
  *B33Y 50/02*   (2015.01)
  *B29C 64/393*  (2017.01)

(52) U.S. Cl.
  CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2001/0048183 A1 | 12/2001 | Fujita |
| 2005/0007259 A1 | 1/2005 | Minto |
| 2009/0014086 A1 | 1/2009 | MacMichael |
| 2014/0308624 A1 | 10/2014 | Lee |
| 2015/0165678 A1 | 6/2015 | Ding |
| 2015/0309473 A1 | 10/2015 | Spadaccini |

FOREIGN PATENT DOCUMENTS

| | | |
|---|---|---|
| JP | 2004-042545 | 2/2004 |
| KR | 10-1387637 | 4/2014 |
| WO | WO 2013-095968 | 6/2013 |
| WO | WO 2013-122662 | 8/2013 |
| WO | WO 2013-181262 | 12/2013 |
| WO | WO 2014-058540 | 4/2014 |
| WO | WO 2014-126834 | 8/2014 |
| WO | WO 2014-179141 | 11/2014 |
| WO | WO 2015-015261 | 2/2015 |
| WO | WO 2015-073365 | 5/2015 |
| WO | WO 2016-014766 | 1/2016 |
| WO | WO 2016-073162 | 5/2016 |

ADDITIVE MANUFACTURING SYSTEM AND A METHOD OF ADDITIVE MANUFACTURING

FIELD OF THE INVENTION

The invention relates to an additive manufacturing system, and in particular to an additive manufacturing system which has a plurality of resin supplies for supplying different light hardenable resins in direct contact with each other on a light permeable base for building up a workpiece from the different light hardenable resins. The invention further relates to a method of additive manufacturing a workpiece.

BACKGROUND ART

In the field of dentistry, dental restorations, for example replacement teeth, are more and more manufactured in automated processes, which typically include the use of computer-aided design (CAD) techniques and manufacturing by Computer Numerical Controlled (CNC) machines. Further, so-called build-up processes have been proposed for making of dental restorations. Such a build-up process typically allows building up an individual dental restoration in substantially its desired individual shape, generally by subsequently adding material to create that shape instead of providing an oversized standardized blank from which material is removed in a subsequent process.

While build-up processes are meanwhile widely used in the industry for rapid prototyping, the manufacturing of final products in many areas is still challenging. For making dental restorations it is generally required to use materials that are compatible for use in a human body. Further, a dental restoration manufactured by a build-up process must fulfill requirements to mechanical stability as well as expectations about aesthetics, concerning for example color shading and translucency.

Some rapid prototyping systems are based on stereolithography. Stereolithography generally uses light (typically a UV laser) for hardening a light hardenable or photopolymer resin. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired outer shape of the three-dimensional object. Typical stereolithography systems are configured for operating with a single resin.

Although existing processes for making dental restorations are advantageous in different respects there is a general desire to provide a process for making individual or customized dental restorations at a high degree of automation, maximized quality and minimized costs.

SUMMARY OF THE INVENTION

The invention relates to an additive manufacturing system. The system is preferably particularly configured for building up a dental restoration. The system comprises a resin vat comprising or forming a light permeable base, a build carrier for holding a workpiece built up by the system and a light source which is arranged to emit light through the light permeable base toward a region between the light permeable base and the build carrier. The light permeable base and the build carrier are positionable relative to each other in a build dimension in which the workpiece is built up. The system further comprises at least one resin supply for supplying different light hardenable resins in direct contact with each other in said resin vat.

The invention is advantageous in that it allows building up a dental restoration in its final material structure and at a high level of optical aesthetics. In particular, the invention can be used for making a dental restoration which does not need any sintering step. Further, the invention is advantageous in that it allows the making of dental restorations in tooth colors, including a tooth color gradation, which resemble a natural tooth. Therefore the system and method of the invention can be used in the dental industry as well as in a dentists practice ("chairside"). The invention is also advantageous in that it allows for making a dental restoration rapidly, for example during or in parallel to the treatment of a patient.

Further the light permeable base preferably forms a build surface and the build carrier forms a retention surface. The retention surface serves for retaining the workpiece to the build carrier. Thus, the workpiece can be moved and positioned by moving and positioning the build carrier. The build surface and the build carrier preferably face each other. In particular, the build surface and the build carrier are arranged opposite of each other.

In a further embodiment the system comprises a plurality of resin supplies for supplying different light hardenable resins. Each of the plurality of the resin supplies may be provided for supplying a different light hardenable resin.

In one embodiment the system is configured such that the system can control the at least one resin supply for adding new light hardenable resin in direct contact with light hardenable resin present in the vat during building up the workpiece.

In an embodiment the system is set up to build up a workpiece by performing the following steps:
(a) using the at least one resin supply to provide a portion of a light hardenable resin in the resin vat;
(b) positioning the build carrier and the light permeable base at a predetermined distance relative to each other;
(c) emitting light by the light source toward the region between the light permeable base and the build carrier for hardening the hardenable resin in said region; and
(d) successively repeating steps (a) to (c), whereby during building up the workpiece step (a) is performed at least a first time for supplying a first light hardenable resin in the resin vat and a second time for supplying a different second light hardenable resin in the resin vat. This means that during building up the workpiece at least two different light hardenable resins are supplied in the vat.

The system may be set up to build up a workpiece by performing the following steps:
(a) optionally using the at least one resin supply to provide a portion of a light hardenable resin in the resin vat;
(b) positioning the build carrier and the light permeable base at a predetermined distance relative to each other;
(c) emitting light by the light source toward the region between the light permeable base and the build carrier for hardening the hardenable resin in said region; and
(d) successively repeating steps (a) to (c), whereby during building up the workpiece at least two different light hardenable resins are supplied in the vat. In this embodiment a portion of a light hardenable material may be pre-provided in the resin vat, for example manually by a user or automatically by one of the resin supplies.

The system is preferably configured such that each resin supply can be controlled individually. Therefore, during building up the workpiece the different resin supplies may be used to consecutively provide different light hardenable resins in the vat. Although it is preferred that the different light hardenable resins are provided on top of each other in the vat, the system is preferably further configured to use two or more resin supplies to simultaneously supply different light hardenable resins in the vat. Thus, in case the different light hardenable materials exhibit different colors and/or translucencies, a workpiece, in particular a dental restoration, can be provided which has a color gradation in one or more dimensions.

In one embodiment the system comprises a computer-based control system. The control system is preferably configured to control the resin supply dependent on the build progress. In particular, the control system may be configured to initiate the supply of one of a plurality of different light hardenable resins in association with one or both of the steps (b) and/or (c).

In one embodiment the system is set up for performing the following steps:
providing a data based computer model of at least a portion of the shape of the workpiece;
determining a volume of hardened resin or resin to be hardened in at least one layer of the workpiece based on the computer model; and
using the at least one resin supply to provide a quantity of a light hardenable resin in the resin vat, wherein the quantity is determined based on the determined volume of hardened resin or resin to be hardened.

The system may further be set up to perform the step of virtually slicing the computer model into layers as a basis for layerwise building up the workpiece. The data based computer model is preferably a representation of part or all of the workpiece to be built up. Such a computer model may be obtained from a computer aided design (CAD) system. The data may be in STL or any other appropriate data format. Further, the virtual slicing is preferably performed by a computer algorithm which forms planar slices which peripheral boundary corresponds to a portion of the outer boundary of the workpiece. Both, CAD techniques to provide data based computer models as well as slicing software for converting the computer models into a format suitable in build-up processes, are known to the person skilled in the art.

Accordingly, the system of the invention preferably allows for usage-dependent supply of resin during building up the workpiece. In particular, the system of the invention is preferably configured to replace resin that is hardened and retracted from a bath of resin in the vat by a corresponding quantity of new hardenable resin in a controlled manner during building up the process. In this regard a "corresponding quantity" may include a compensation for tolerances that may occur in the process. For example, unhardened resin that may adhere to hardened portions of the workpiece and thus being retracted from the bath along with the workpiece may be accounted for in the step of supplying any new resin. Further, the system is preferably set up such that it automatically selects the type of any hardenable resin supplied during building up the workpiece based on the computer model of the workpiece (or based on additional data associated with the computer model). Thus, the workpiece can be provided with different properties (for example colors and/or translucency) at different portions.

In one embodiment the resin supplies are arranged in a periphery of the light permeable base and surrounding a build area within which the workpiece can be built up. The resin supplies may extend into the vat and form a resin outlet adjacent the light permeable base. Further, the resin supplies may be provided within the vat. For example, the vat may inwardly form resin outlets of associated resin supplies. Preferably vat has a circumferential vat wall within which the resin supplies may be provided. Further, the resin supplies may be provided within the light permeable base. For example, the build surface may form resin outlets of associated resin supplies.

The system may be configured such that the different light hardenable resins can be supplied into the resin vat through the same resin supply. For example, the resin supply may be connectable to different storage tanks storing the different light hardenable resins.

In one embodiment the resin supplies each are in the form of a nozzle. Each nozzle may be selectively brought in fluid connection with one or more resin storage tanks. Each nozzle preferably forms a free end of the respective resin supply. The nozzle may have a shape for guiding the resin in the vat in a particular way. For example the nozzle may correspond to a flat die for supplying the light hardenable resin in the form of a flat strand. This may help distributing the resin in the vat rapidly. Further, each resin supply may be connected or connectable to an associated storage tank holding a particular light hardenable material. Therefore, the system may have different storage tanks holding different light hardenable resins. The system may further have means to merge different light hardenable resins. In particular, the resin supplies may be connected or connectable to more than one storage tank each holding a different light hardenable material.

In one embodiment the at least one resin supply is ring-shaped and surrounds the build area. The resin supply may have a plurality of nozzles distributed over the circumference. Alternatively, the resin supply may have a flat nozzle extending circumferentially.

In a further embodiment the resin supplies and the build carrier are rotatable about a rotation axis that is arranged essentially parallel to the build dimension. Further, the vat and the build carrier may be rotatable about the rotation axis. This rotatability allows for mixing or agitating the hardenable resin in the vat. Further, the supply of the light hardenable resin may be angularly adjusted relative to the workpiece. Thus the color and color gradation of the workpiece may be controlled.

In an embodiment the light source comprises an image projector. A particular image projector is based on Digital Light Processing™ (DLP). The image projector is preferably arranged for emitted light toward the light permeable base. Further, the image projector is preferably arranged for emitting light toward the build carrier, wherein the build carrier is arranged optically behind the light permeable base. The image projector is preferably configured to project the light in the form of a two-dimensional pattern. The pattern is preferably in form of a bitmap-based matrix. The resolution of the matrix is about 1920×1080 pixels. The pattern therefore has bright pixels at which the light impinges on the light hardenable resin which is located on the light permeable base and is dark otherwise (so that outside the bright pixels no light or an insignificant amount of light reaches the light hardenable resin).

The light used in the system is selected such that it suits for hardening the light hardenable material. For example, the light hardenable resin may comprise Irgacure® 819, a photo-initiator available from BASF Germany, which absorbs light in a wavelength of about 310 nm to 430 nm.

Other photo-initiators are possible as appropriate. Accordingly, the light used in the system of the invention comprises or consists of light of this wavelength range. Other light sources may be used like for example LEDs (Light Emitting Diodes), Active-Matrix LEDs, Active-Matrix Organic LEDs or one or more lasers.

The light permeable base and the build carrier are preferably movable relative to each other by computer control and thereby can be positioned relative to each other. The system is preferably configured for moving the light permeable base and the build carrier away from each other stepwise in steps of between about 1 µm and 100 µm.

The system of the invention may comprise a light hardenable resin. The light hardenable resin may comprise a radically curable unsaturated monomer in an amount ranging from 20% to 99% per weight, an inorganic filler in an amount ranging from 1% to 80% per weight and a photoinitiator in an amount ranging from 0.001% to 5% per weight.

In a further aspect the invention relates to a method of additive manufacturing a workpiece, in particular a dental workpiece. The method comprises the steps of:
(a) providing a system that comprises a resin vat forming a light permeable base, a build carrier for holding a workpiece built up by the system, and a light source which is arranged to emit light through the light permeable base toward a region between the light permeable base and the build carrier, the system further comprising at least one resin supply;
(b) optionally using the at least one resin supply to provide a portion of a light hardenable resin in the resin vat;
(c) positioning the build carrier and the light permeable base at a predetermined distance relative to each other;
(d) emitting light by the light source toward the region between the light permeable base and the build carrier for hardening the hardenable resin in said region;
(e) successively repeating steps (b) to (d) for building up the workpiece;
whereby during building up the workpiece step (a) is performed at least a first time for supplying a first light hardenable resin in the resin vat and a second time for supplying a different second light hardenable resin in the resin vat.

During building up the workpiece at least two different light hardenable resins may be supplied in direct contact with each other in said vat.

In one embodiment the method comprises the steps of:
(a) providing a system that comprises a resin vat forming a light permeable base, a build carrier for holding a workpiece built up by the system, and a light source which is arranged to emit light through the light permeable base toward a region between the light permeable base and the build carrier, the system further comprising at least one resin supply;
(b) using the at least one resin supply to provide a portion of a light hardenable resin in the resin vat;
(c) positioning the build carrier and the light permeable base at a predetermined distance relative to each other;
(d) emitting light by the light source toward the region between the light permeable base and the build carrier for hardening the hardenable resin in said region;
(e) successively repeating steps (b) to (d) for building up the workpiece;
whereby at least two different light hardenable resins are used in step (b).

The method preferably comprises the steps of providing a portion of a light hardenable resin in the resin vat, positioning the build carrier and the light permeable base at a predetermined initial distance relative to each other and emitting light by the light source toward the light hardenable resin between the light permeable base and the build carrier for hardening the hardenable resin. Thus, an initial layer of hardened resin is generated that extends between the light permeable base and the build carrier. For creating the initial layer the resin vat may be pre-filled with a light hardenable resin. From this stage the method may be further performed by step (b). Thereby the same or a different light hardenable resin may be used. Subsequently step (c) may be performed with positioning the build carrier and the light permeable base by a displacement of the build carrier over a distance corresponding to the initial distance. Upon performing of step (d) and thereby exposing the resin between the initial layer and the light permeable base with light, a second layer is generated having essentially the same thickness as the initial layer. From this stage steps (b) to (d) may be repeated to build up the workpiece from a plurality of layers. Each new layer thus is created by emitting light to the light hardenable resin between the light permeable base and the part of the workpiece already built. The predetermined distance preferably increases during building up the workpiece. The increase is controlled stepwise with essentially equal steps so as to layerwise build up the workpiece. During building up a workpiece the light permeable base and the build carrier are preferably moved away from each other stepwise. The steps are between about 200 µm and about 10 µm.

In one embodiment the method comprises the steps of:
providing a data based computer model of at least a portion of the shape of the workpiece;
determining a volume of hardened resin or resin to be hardened in at least one layer of the workpiece based on the computer model; and
using the at least one resin supply to provide a quantity of a light hardenable resin in the resin vat, wherein the quantity is determined based on the determined volume of hardened resin or resin to be hardened.

The method may further comprise the step of virtually slicing the computer model into layers as a basis for layerwise building up the workpiece.

In one embodiment the method comprises one or more steps for building up an auxiliary compartment along with (in parallel to) building up the workpiece. The auxiliary compartment preferably is shaped to separate a partial volume from a greater volume provided in the resin vat. Further, the auxiliary compartment is preferably formed by a membrane built from the light hardenable resin in the resin vat. The membrane may form a first end which abuts the vat wall along a first line that extends from a first location on the vat wall adjacent the light permeable base to a different second location on the vat wall adjacent the light permeable base. The membrane may further form a second end which extends parallel to the light permeable base along a second line that extends between the first and second location. The membrane preferably extends contiguously between the first and the second line. Further, the membrane may be located to enclose at least one resin outlet within the auxiliary compartment. Therefore, the auxiliary compartment predominantly contains resin provided by the enclosed resin outlet. For example the auxiliary compartment may contain a resin that has a different color than the color of the resin in the remainder of the vat. (Instead or in addition to different colors the resign may be adapted to assume different translucencies, and/or mechanical properties like different hardnesses or different resiliences, for example.) Generally, the resins are preferably chemically compatible. This enables building up a workpiece that is not only shaded in the build dimension but that further has different color areas in a dimension lateral of the build dimension. It is noted that the auxiliary compartment gets spaced from the light permeable base upon the step of positioning the build carrier and the light permeable base at a predetermined distance relative to each other. However, although the auxiliary compartment in this situation does not fully seal with the light permeable base, different resins inside and outside the auxiliary compartment remain substantially separate. This is because both, resin enclosed by the auxiliary compartment and resin present outside the auxiliary compartment, flow substantially simultaneously toward the light permeable base when the build carrier and the light permeable base are moved away from each other. The resins from inside and outside the auxiliary compartment substantially meet under the membrane along the second line. The viscosity of the resin may be adjusted so that two different resins at the area at which they meet intermingle more or less partly. For example a low viscosity provides higher intermingling than a high viscosity.

A CAD system may be provided for automatically generating such a membrane based on a shading designed in the object. The CAD system may be configured to determine a merging line between two portions of different properties (for example differently colored portions) of the object. The merging line may be used to automatically form a virtual projection that correspond to the membrane.

The method preferably provides for usage-dependent supply of resin during building up the workpiece. In particular, resin that is hardened and retracted from a bath of resin in the vat may be replaced by a corresponding quantity of new hardenable resin in a controlled manner during building up the process. Further, the type of any hardenable resin supplied during building up the workpiece may be automatically selected based on the computer model of the workpiece (or based on additional data associated with the computer model). Thus, the workpiece can be provided with different properties (for example colors and/or translucency) at different portions.

DETAILED DESCRIPTION OF THE INVENTION

Figure 1:
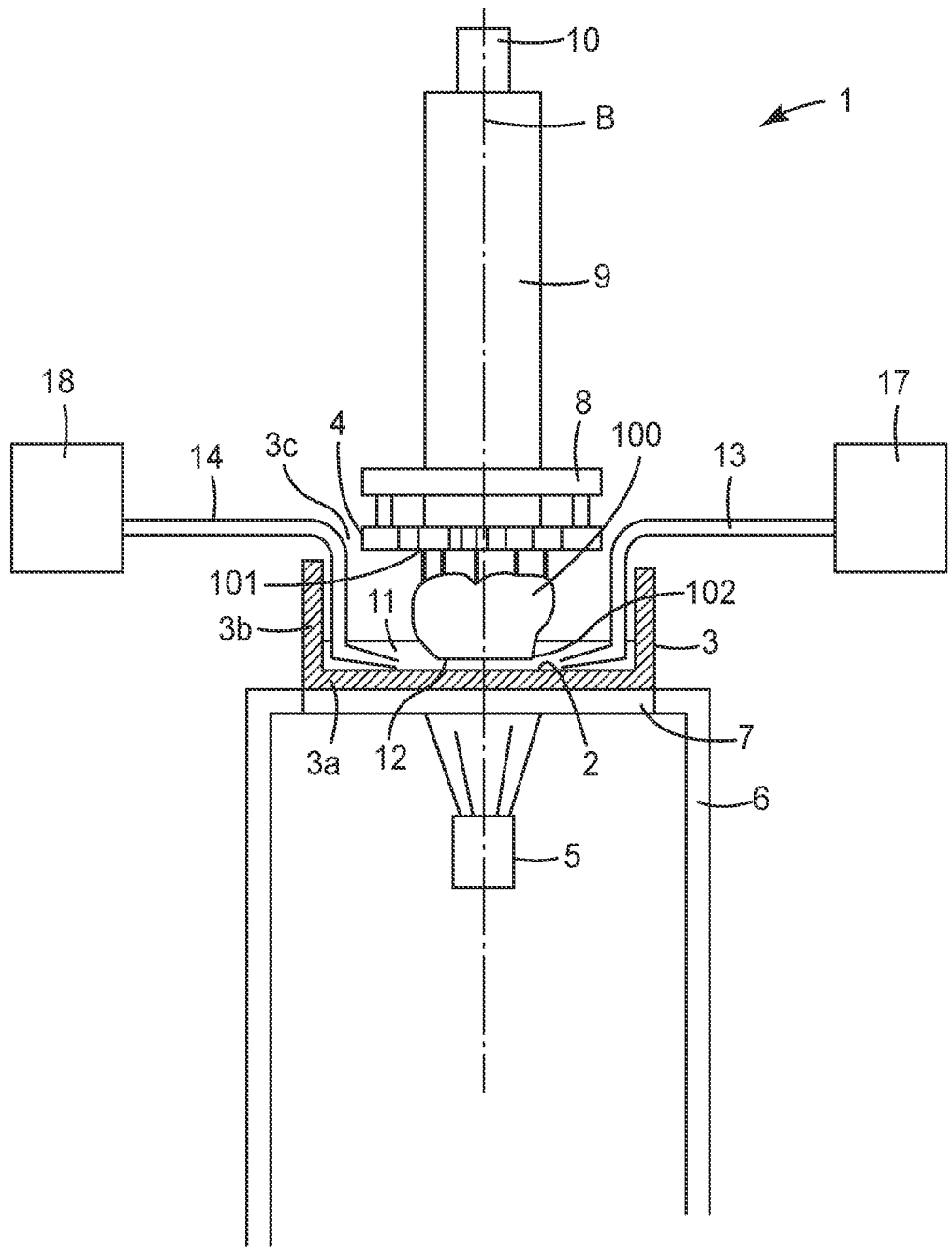
FIG. 1 is a partially cross-sectional front view of an additive manufacturing system according to an embodiment of the invention.

FIG. 1 shows an additive manufacturing system 1. The system 1 comprises a light permeable base 2 which in the example is part of a vat 3. The vat 3 and in particular the light permeable base 2 are made of a transparent material. Suitable materials include for example silica glass or polycarbonate. Other materials are possible as appropriate. The vat 3 is generally cup-shaped. In particular, the vat 3 has a bottom wall 3a, a side wall 3b and forms an opening 3c opposite of the bottom wall 3a. The vat 3 in the example is generally circular (has a circular side wall), although other geometries are possible.

The system 1 is generally configured to build up a workpiece 100 by adding increments or layers of material (hardened resin) at a bottom of the workpiece while successively moving the workpiece upwards. In this regard the term "bottom" refers to an end of the workpiece which essentially faces the center of gravity and the term "upwards" refers to a direction opposite of the center of gravity. Further, the workpiece 100 is maintained submerged with its bottom in a bath of light hardenable resin. Accordingly, the workpiece is successively pulled in a direction away from the resin bath while portions of material in the bath are hardened and thus added to the workpiece.

The system 1 comprises a build carrier 4. The build carrier 4 is configured to hold a workpiece built up by the system, as further explained in detail below. Further the system 1 comprises a light source 5, which in the example is an image projector that is based on Digital Light Processing™. Digital Light Processing (DLP) uses micro-mirrors arranged in a matrix on a semiconductor chip. Such semiconductor chips are known as Digital Micromirror Devices ("DMD"). Typical mirrors of a DMD have a size of about 5 µm or less. Each of the mirrors are movable between two positions by control of the semiconductor. In the one position the mirror is positioned to reflect light directed on the mirror through the light output, whereas in the other position the mirror is positioned so that the light directed on the mirror does not exit the projector. Each mirror typically represents one pixel in the projected image so that the number of mirrors typically corresponds to the resolution of the projected image. The skilled person will recognize that other projector techniques or a laser beam may be likewise used with the system of the invention.

In the example, the system has a housing 6 which has at least a light permeable area 7. The light permeably area is arranged generally horizontal (perpendicular to the direction of the force of gravity). The vat 3 is removably placed with the light permeable base 2 on the light permeable area 7. Thus, light emitted by the light source 5 and transmitted through the light permeable area 7 of the housing 6 is also transmitted through the light permeable base 2 of the vat 3. It is preferred that the light permeable area 7 and the light permeable base 2 are transparent and clear. Thus, the image sharpness of the image projected to the light permeable base is maximized. This is also a basis for building up the workpiece at maximized accuracy.

The build carrier 4 is positionable relative to the light permeable base 2 by computer control. In particular, the build carrier 4 is movable at least in a dimension essentially perpendicular to the light permeable base 2 (and perpendicular to the light permeable area 7). The dimension essentially perpendicular to the light permeable base 2 is also referred to as "build dimension" herein (in the Figure designated as "B"). Further the build dimension is generally vertical (coinciding with the direction of the force of gravity). The workpiece 100 is build up in the system 1 in the build dimension B. In particular the build-up process is performed downwards (in the direction of the force of gravity) in relation to a portion of the workpiece created first. This is achieved by pulling the workpiece successively upwards as it is built up.

In another example the build carrier may be movable in one or two further dimensions according to a three-dimensional Cartesian coordinate system. The build carrier 4 is connected to a linear drive 9 via a support 8. The linear drive 9 in the example has a spindle (not shown) which is mechanically coupled to the support 8 such that the support 8 can be moved in two directions in the build dimension B. The linear drive 9 further has a motor 10 and a position measuring system. Thus, the support 8 and the attached build carrier 4 can be accurately positioned by control of the system 1. The skilled person will recognize that the support can be directly configured as build carrier in another example, and that the build carrier may be connected by other means with the linear drive.

In the example, a dental crown forms the workpiece 100. At the illustrated stage the dental crown is already partially built up in the system 1. Generally, the workpiece 100 is build up in a region between the build carrier 4 and the light permeable base 2. In particular, the workpiece 100 is carried at a first end 101 of the workpiece 100 by the build carrier 4. The build carrier 4 at the stage shown is positioned such that a space 12 is formed between an opposite second end 102 of the workpiece 100 and the light permeable base 2. The space 12 has a pre-determined thickness in the build dimension. Further, a light hardenable resin 11 is provided in the vat 3. The amount of the light hardenable resin 11 is selected such that a resin bath of a pre-determined fill level is form. The fill level of the light hardenable resin 11 corresponds to or is higher than the thickness of the space 12. Accordingly, the space 12 is entirely filled with the light hardenable resin 11. At this stage the image projector 5 can be used to emit light through the light permeable base 2 into the space 12. The light is preferably emitted in the form of a two-dimensional pattern in a plane parallel to the light permeable base 2. Accordingly, the light hardenable resin 11 is irradiated locally in accordance to the pattern of the light pattern. In particular, any light pixel of the pattern causes such portions of the light hardenable resin 11 to harden which are exposed to the light of the light pixel. The light hardenable resin 11 is typically light permeable to a certain extent so that the light penetrates entirely through the light hardenable resin 11 in the space 12. Therefore, the hardened portions connect with the workpiece 100 already built up and become part of a complemented workpiece. From this stage the complemented workpiece can be retracted from the light permeable base 2 so as to create a new space filled with hardenable resin which can be irradiated by a further light pattern to further complement the workpiece, and so on, until the workpiece is built up layer by layer completely. The build carrier has a retention surface at which the workpiece 100 adheres. The retention surface provides for a retention of the hardened resin which is better than the retention of the hardened resin on the light permeable base 2. Thus, upon puling the workpiece away from the light permeable base, the workpiece stays retained at the build carrier while it disconnects from the light permeable base. The skilled person will recognize several technical possibilities of controlling the better adhesion of the hardened resin at the build carrier, including the selection of materials for the build carrier 4 and the light permeable base 2, the configuration of the surface roughness of the build carrier 4 and the light permeable base 2, the arrangement of retention elements, or a combination thereof. The light permeable base 2 is optionally coated with a non-stick coating, for example a polytetrafluorethylene. Thus, the hardened resin loosens easily from the light permeable base while the hardened portions of different layers adhere to each other. Therefore, any breaking apart of the built up workpiece during retraction can be prevented.

During retraction of the workpiece hardenable resin in the vat is—by nature of physics—sucked (or pressed by the ambient pressure) in to the emerging space. To prevent the fill level from dropping below the thickness of the space (which could cause a void in the object) further hardenable resin is provided in the vat prior to and/or simultaneously with retraction of the workpiece.

The system 1 has a first and a second resin supply 13, 14. The first resin supply 13 is provided for supplying a first light hardenable resin and the second resin supply is provided for supplying a different second light hardenable resin. The difference between the first and second light hardenable resin in the example is the color and/or translucency, but may in other examples be material strength, type, composition or a combination thereof. The first and second light hardenable resins are stored in first and second storage tanks 17, 18, respectively.

In a first operation mode of the system 1 the first hardenable resin is provided by the first resin supply 13 in the vat 3 for building up one or more layers of the workpiece and subsequently the second hardenable resin is provided by the second resin supply 14 in the vat 3 for building up one or more further layers. At the stage of switching from the first to the second hardenable resin the second hardenable resin is preferably provided onto a residual fill level of the first hardenable resin. Therefore, at the interface between the first and the second hardenable resin the first and second hardenable resins merge and form a smooth transition. This allows for building up the workpiece with a color gradation in which the colors change smoothly from one color to the other. In particular dental restorations may be build up at a color gradation which pleasantly resembles the color gradation of a natural tooth. In the example the resin supply is controlled by the system 1 based on computer instructions input in the system 1 via network, interface or a user.

In a second operation mode of the system 1 the first and second light hardenable resins are simultaneously provided in the vat 3 by the first and second resin supplies 13, 14 for building up one or more layers of the workpiece. The first and second hardenable resins may be provided in different amounts and/or timely offset. Accordingly, a single layer of resin provided in the vat is formed of two different resins arranged essentially side by side (in a dimension laterally to the build dimension). Therefore, the system 1 allows for building up workpieces having a color gradation in the build dimension, a color gradation laterally thereto and a combination of both (for example inclined to the build dimension).

In the example, the vat 3 and the build carrier 4 may be rotatable relative to each other. Further, the resin supplies 13, 14 and the build carrier 4 may be rotatable relative to each other. Therefore, by rotating the vat 3 and the resin supplies 13, 14 relative to each other the any resin in the vat 3 may be mixed by means of the resin supplies 13, 14 extending into the resin. Further, by rotating the build carrier 4 and the resin supplies 13, 14 relative to each other, different resins as supplied by the different resin supplies 13, 14 may be arranged to different angular positions of the workpiece.

Figure 2:
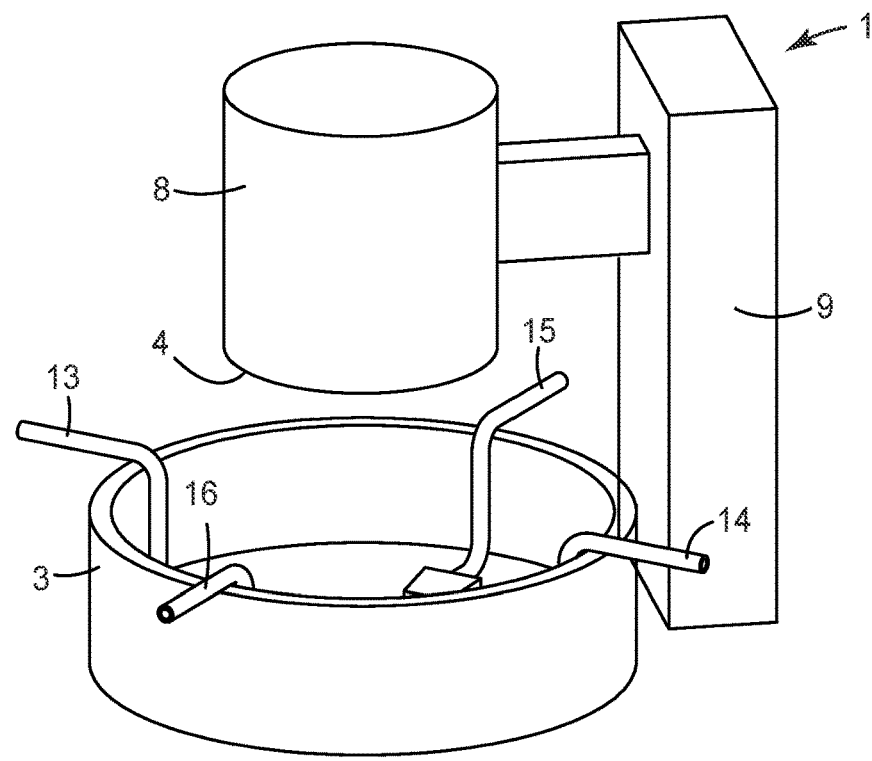
FIG. 2 is a perspective view of an additive manufacturing system according to an embodiment of the invention.

FIG. 2 shows a system 1 which is technically identical with the system shown in FIG. 1 but which has two additional resin supplies 15, 16. Therefore, the system 1 has four resin supplies 13, 14, 15, 16 for supplying four different light hardenable resins.

Figure 3:
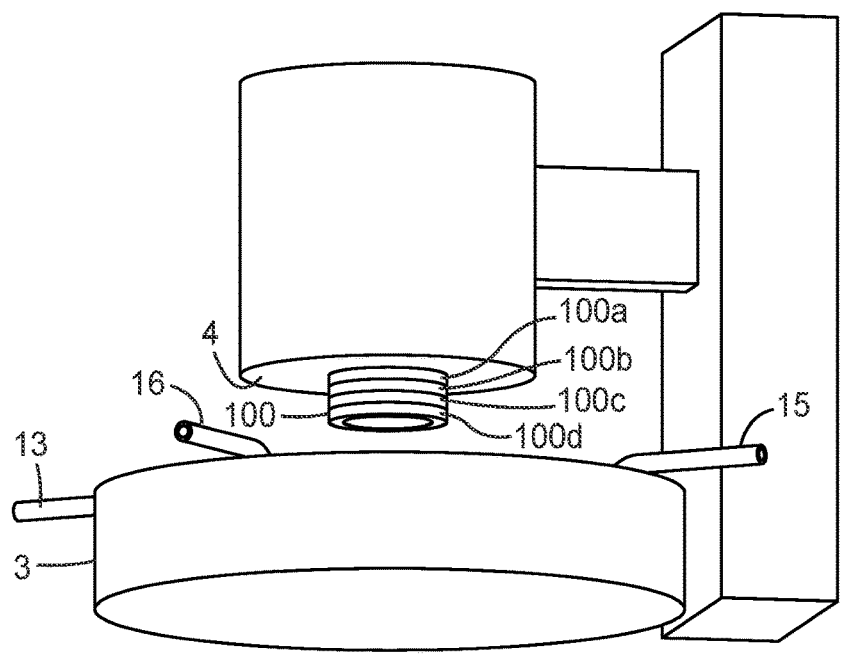
FIG. 3 is a perspective view of the system shown in FIG. 2 at a different stage of operation.

In FIG. 3 the system 1 is illustrated with an exemplary workpiece 100 formed of different layers 100a, 100b, 100c, 100d of different hardened resins. At the stage shown the workpiece 100 is fully retracted from the vat 3. The workpiece 100 as illustrated is obtained by consecutively using the resin supplies 13, 14, 15, 16 to provide a portion of a light hardenable resin in the resin vat 3, positioning the build carrier 4 relative to the light permeable base 2, and emitting light in the hardenable resin on the light permeable base 2. Thus, four layers of different hardened resins are formed.

Figure 4:
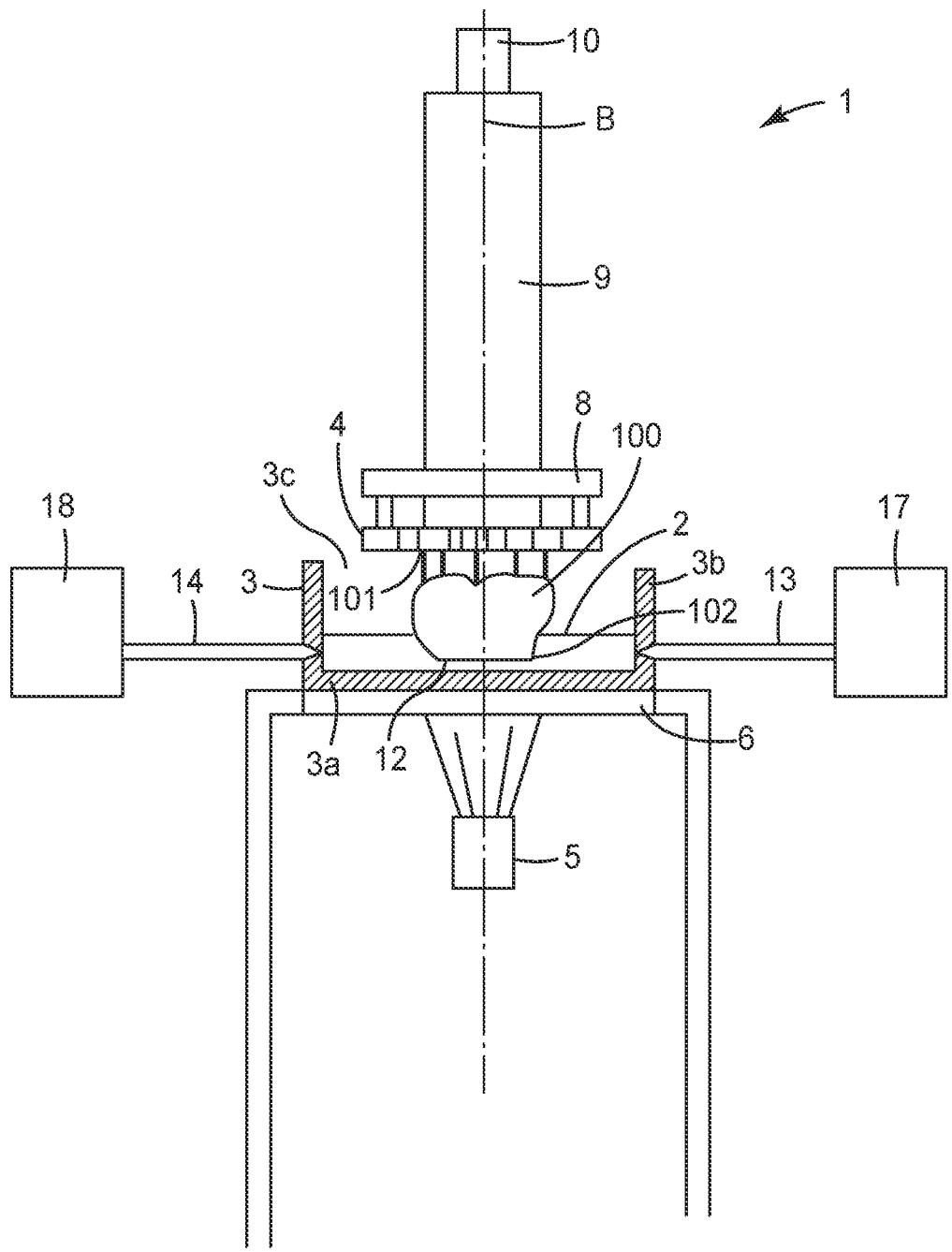
FIG. 4 is a partially cross-sectional front view of a further additive manufacturing system according to an embodiment of the invention.

FIG. 4 shows a system 1 which is technically identical with the system shown in FIG. 1, except for the arrangement of the resin supplies 13, 14. In the example, the resin supplies 13, 14 are arranged in the side wall 3b. In particular, the resin supplies 13, 14 each form a resin outlet in the vat side wall 3b. In this example (although not shown), the vat 3 can be sized essentially according to the size of the build carrier 4 of the vat 3. Thus, the space in the vat may be used relatively efficiently. Further, the amount of resin not used for building up the workpiece 100 may be minimized, for example by minimizing the vat size. In the system 1 more than the two resin supplies 13, 14 may be provided. For example, a multiplicity of resin supplies may be arranged uniformly distributed over the circumference of the vat wall. Thus, a multiplicity of different hardenable resins can be used for building up the workpiece 100. In this example the resin supplies 13, 14 have a fixed position relative to the vat.

Figure 5:
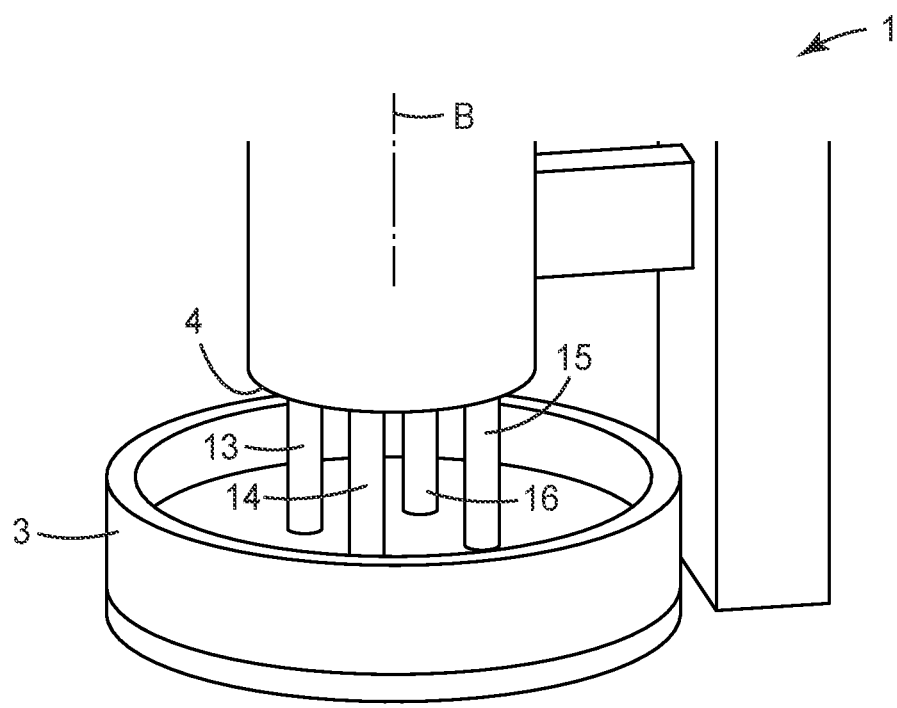
FIG. 5 is a perspective view of an additive manufacturing system according to an embodiment of the invention.
Figure 6:
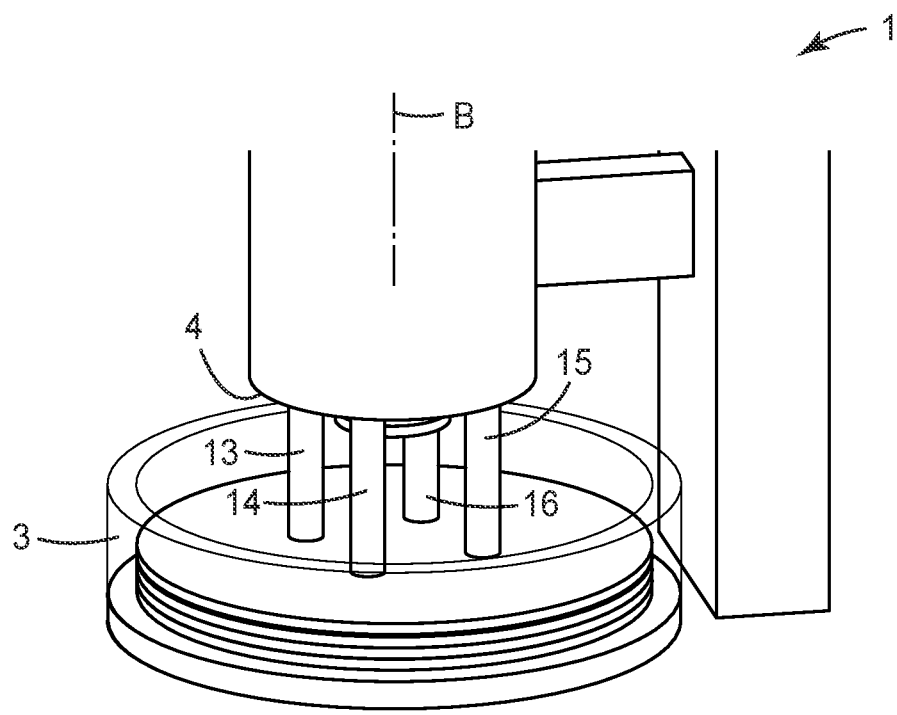
FIG. 6 is a perspective view of the system shown in FIG. 5 at a different stage of operation.

FIGS. 5 and 6 show a further example of the system 1 which is technically identical with the system shown in FIGS. 2 and 3 except for the arrangement of the resin supplies. In particular, resin supplies 13, 14, 15, 16 are arranged essentially parallel to the build dimension B and each form an outlet adjacent the light permeable base 2. The resin supplies 13, 14, 15, 16 extend through the build carrier 4. In the example, the vat size can be minimized as described in the example of FIG. 4, but further a rotation of the vat 3 and the build carrier 4 relative to each other can be used to mix any resin in the vat.

Figure 7:
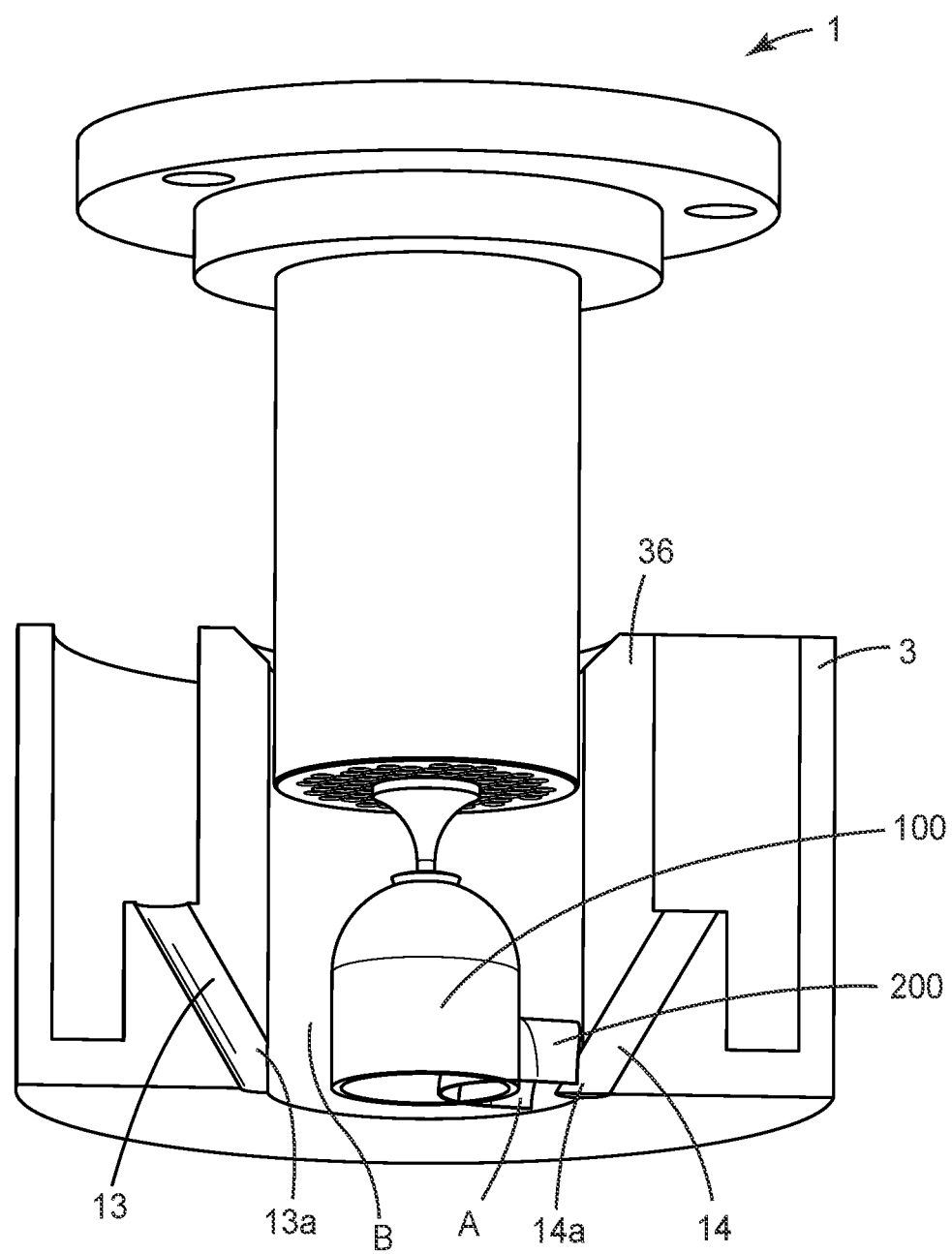
FIG. 7 is a partially cross-sectional front view of an additive manufacturing system according to an embodiment of the invention.

FIG. 7 shows a system 1 which is technically identical with the system shown in FIG. 1, except for the arrangement of the resin supplies 13, 14. The first and second resin supply 13, 14 each form a first and second resin outlet 13a, 14a, respectively, in the vat side wall 3b. Although the example may differentiate from other examples by the arrangement of the resin supplies 13, 14 the build-up process described in the following can be performed with any of the systems described (in particular but not exclusively in the FIGS. 1-6) herein.

In the example, the system is set up so that the first resin supply 13 provides a first resin and so that the second resin supply 14 provides a second resin. The first and second resin are different, in particular have different colors in the example.

At the stage as illustrated a workpiece 100 has been at least partially built up. Further, an auxiliary compartment 200 has been built up together with the workpiece 100. The auxiliary compartment 200 is formed by a (preferably thin) membrane. The membrane is built from the light hardenable resin in the resin vat 3. Because the membrane is preferably thin the auxiliary compartment 200 can be removed from the workpiece 100 without substantially damaging the workpiece 100.

The auxiliary compartment is shaped to separate a partial volume A from a greater volume B provided in the resin vat 3.

Figure 8:
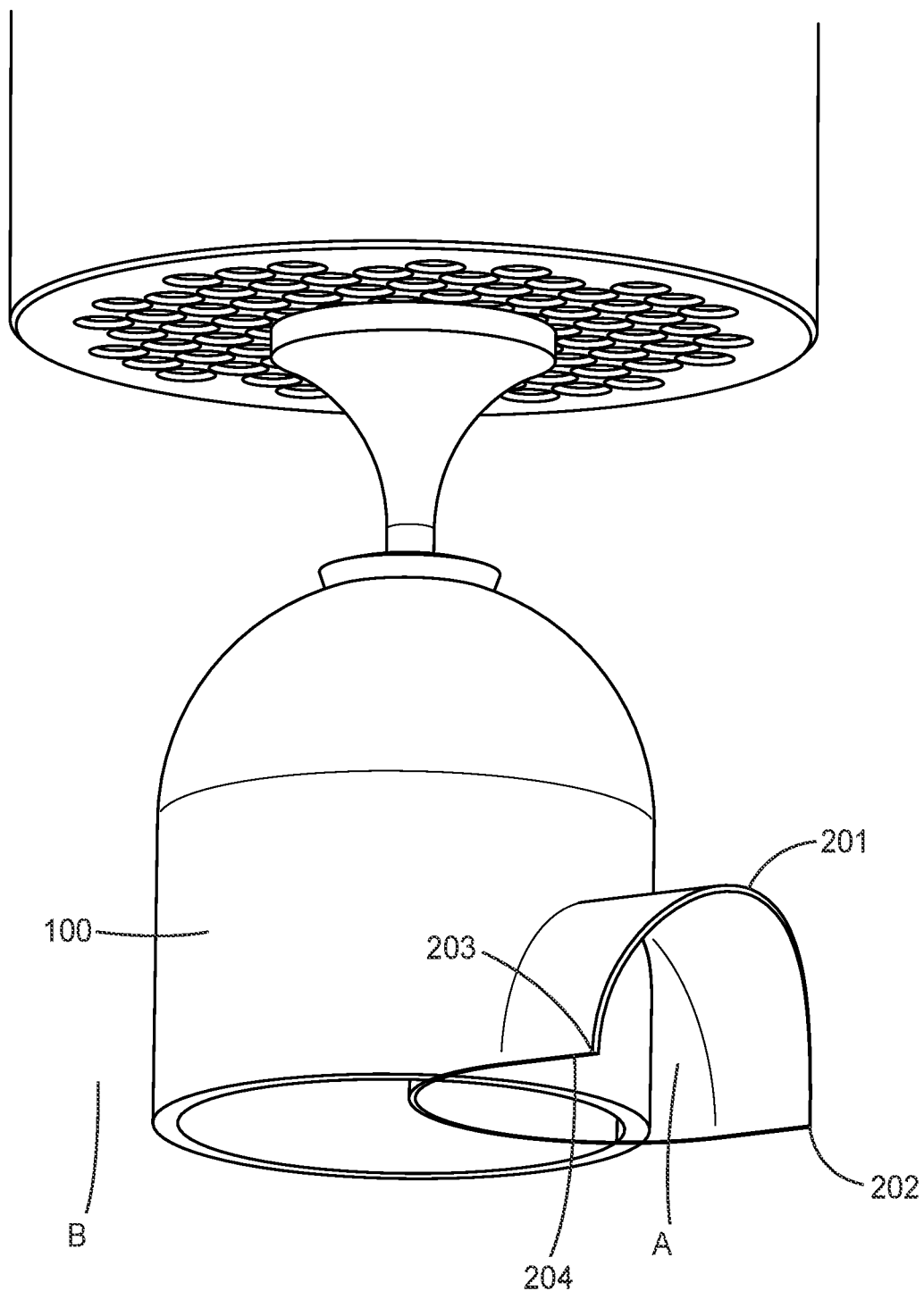
FIG. 8 is a detail view of FIG. 7.

The workpiece 100 and the auxiliary compartment 200 are shown in more detail in FIG. 8. The membrane forms a first end 201 which abuts the vat wall (not illustrated in this view) along a first line that extends from a first location 202 on the vat wall adjacent the light permeable base (not illustrated in this view) to a different second location 203 on the vat wall adjacent the light permeable base. The membrane further forms a second end 204 which extends parallel to the light permeable base along a second line that extends between the first and second location 202, 203. The membrane extends contiguously (as a closed structure) between the first and the second line 203. Because the first and second line each extend essentially U-shaped the membrane in essence corresponds in shape to a section of an outer shell of a donut.

Further, the membrane encloses the second outlet 14a within the auxiliary compartment 200. Accordingly, resin provided through the second resin supply 14 flows directly into the auxiliary compartment. On the other hand, resin provided through the first resin supply 13 flows directly into the resin vat outside the auxiliary compartment 200. Therefore, the auxiliary compartment 200 predominantly contains resin provided by the second resin supply 14, and the remainder of the resin vat 3 predominantly contains resin provided by the first resin supply 13. It is noted that more than one auxiliary compartment may be provided each enclosing one or more resin supplies. Further one auxiliary compartment enclosing several resin supplies may be provided. More than one resin supplies may further be provided for the remainder of the resin vat for providing resins in the resin vat outside of the auxiliary compartment(s).

What is claimed is:

1. A method of additive manufacturing a workpiece, comprising the steps of:
   (a) providing a system that comprises a light permeable base, a build carrier for holding a workpiece built up by the system, and a light source which is arranged to emit light through the light permeable base toward a region between the light permeable base and the build carrier, the system further comprising a resin vat and at least one resin supply, wherein the light permeable base forms a wall portion of the resin vat,
   (b) using the at least one resin supply to provide a portion of a light hardenable resin in the resin vat;
   (c) positioning the build carrier and the light permeable base at a predetermined distance relative to each other;
   (d) emitting light by the light source toward the region between the light permeable base and the build carrier for hardening the hardenable resin in said region;
   (e) successively repeating steps (b) to (d) for building up the workpiece; and
   (f) building up an auxiliary compartment along with building up the workpiece, wherein the auxiliary compartment is shaped to separate a partial volume from a greater volume provided in the resin vat,
   whereby during building up the workpiece step (a) is performed at least a first time for supplying a first light hardenable resin in the resin vat and a second time for supplying a different second light hardenable resin in the resin vat.

2. The method of claim 1, wherein the predetermined distance increases during building up the workpiece and wherein the increase is controlled stepwise with essentially equal steps so as to layerwise build up the workpiece.

3. The method of claim 2, comprising the steps of
   providing a data based computer model of at least a portion of the shape of the workpiece;

determining a volume of hardened resin or resin to be hardened in at least one layer of the workpiece based on the computer model; and using the at least one resin supply to provide a quantity of a light hardenable resin in the resin vat, wherein the quantity is determined based on the determined volume of hardened resin or resin to be hardened.

4. The method of claim 1, wherein the auxiliary compartment is formed by a membrane built from the light hardenable resin in the resin vat.

5. The method of claim 1, whereby successively repeating steps (b) to (d) for building up the workpiece comprises, at least once, supplying the first or second light hardenable resin directly to the auxiliary compartment.

\* \* \* \* \*